[15] 3,669,929

Bilow

[45] *June 13, 1972

[54] METHOD OF PREPARING AROMATIC RESINS AND PRODUCTS THEREOF

[72] Inventor: Norman Bilow, Los Angeles, Calif.

[73] Assignee: Hughes Aircraft Company, Culver City, Calif.

[ * ] Notice: The portion of the term of this patent subsequent to Jan. 12, 1988, has been disclaimed.

[22] Filed: Jan. 7, 1971

[21] Appl. No.: 104,818

Related U.S. Application Data

[63] Continuation-in-part of Ser. No. 665,261, Sept. 5, 1967, abandoned.

[52] U.S. Cl. .............................260/47 R, 161/182, 260/2 R, 260/2 H, 260/33.8 R, 260/49, 260/79, 260/79.3 M
[51] Int. Cl. .........................................................C08g 33/00
[58] Field of Search................260/2 H, 2 R, 47 R, 79, 79.3 M

[56] References Cited

UNITED STATES PATENTS 3,338,844   8/1967   Harris et al. ................................260/2
3,423,335   1/1969   Phillips .......................................260/2

FOREIGN PATENTS OR APPLICATIONS 956,334   4/1964   Great Britain

OTHER PUBLICATIONS

Olah, Friedel–Crafts and Related Reactions Vol. I, Interscience, N.Y. 1963 (pp. 26–27, 32–33, 201–03).
Olah, Friedel–Crafts and Related Reactions Vol. II, Interscience, N.Y. 1964 (page 477).

*Primary Examiner*—Melvin Goldstein
*Attorney*—W. H. MacAlister, Jr. and Alton V. Oberholtzer

[57] ABSTRACT

Improved lacquer, varnish, and plastic compositions utilizing aromatic polyphenylene polymers having a mean molecular weight of not over 1,000 ± 500, reacted with a curing agent, as a polymethylol aromatic compound in the presence of a polymerization catalyst, prepared in solution in a low boiling solvent of about 50° to 120° C.

7 Claims, No Drawings

0,929

METHOD OF PREPARING AROMATIC RESINS AND PRODUCTS THEREOF

This application is a Continuation-in-Part of Ser. No. 665,261, filed Sept. 5, 1967, now abandoned.

The invention herein described was made in the course of or under a contact with the Air Force.

FIELD OF INVENTION OR IMPROVEMENT

This invention relates to an improvement and discovery in the method of preparing aromatic polymer resins providing improved modified and unmodified polyphenylene lacquer, varnish and plastic compositions, and the products thereof. More particularly, the improvement concerns a discovery useful in the preparation of solutions of aromatic polyphenylene polymers having a mean molecular weight critically of not over $1,000 \pm 500$ reacted with a curing agent combination of the character of a polymethylol aromatic compound and acid catalyst, as 1,4-benzenedimethanol and p-toluenesulfonic acid in a low boiling solvent as chloroform, trichlorethylene, and the like, or mixtures of the same, to effect the production of superior coatings, composite laminate structures and molding parameters in conjunction with facilitating handling to provide composite structures of improved appearance, structural strength and superior hyper-thermal properties for outerspace and commercial applications, including advantageous usage of the preferred combination for mixing with and modifying, or being modified by, the addition thereto of polymers or copolymer resinous forming materials, or mixtures thereof.

BACKGROUND OF THE INVENTION

The preparation of the soluble and plastic poly-phenylenes is provided for in my herewith filed copending application for "Process for Preparing Improved Polyphenylene Polymer Lacquers and Products," Ser. No. 665,286, filed Sept. 5, 1967, now U.S. Pat. No. 3,560,428, and as generally provided for in the application for "Method of Providing Useful Heat-Setting Aromatic Polymer Resinous Compositions and Products," Ser. No. 665,578 filed Sept. 5, 1967, now U.S. Pat. No. 3,555,108, in which I am co-inventor with Leroy J. Miller, likewise assigned to the present assignee, Hughes Aircraft Company, and included herein by reference thereto.

THE INVENTION HEREIN

In the above application, we set forth our discovery in these new resinous compositions and their applicability to preparation in soluble and plastic forms in the broad molecular weight range to $1,000 \pm 500$ to about 5,000 and, more particularly, the extracted polyphenylenes in the weight range of about 1,000 to about 2,500 in relatively soluble and curable form. In addition thereto, I have now discovered that solutions of thermosetting polymers of polyphenylene, preferably selected from the group consisting of polymerization products of biphenyl, ortho- and meta-terphenyls, the 2,2'-, 3,3'-, 2,3'-, 2,4'-, 3,4'-, diphenyl biphenyls, the 1,2,3-, 1,2,4-, and 1,3,5-triphenylbenzenes, mixtures thereof, and mixture thereof with other phenylene oligomers and polyphenyls with not more than five aromatic rings can be prepared. Less preferably, but, if desired, a small amount of benzene up to about one-third by weight may be used with the above. If too much benzene is used, an intractable material is obtained. The para monomer is not adaptable to being polymerized alone for producing the desirable fusible and tractable polyphenylene polymers, but less preferably may be present in trace to limited amounts in the monomer mixture, or present in a polymer mixture with the above polymerized monomers, as a combination mixture, with retention of the desirable polymers in predominately tractable, fusible and curable form.

The preferred polyphenylenes, including a curing agent therefor, are easier to handle and produce better and more homogeneous thermosetting polymer lacquers and plastics when the polyphenylene polymers have a mean molecular weight of not over the critical range of $1,000 \pm 500$. In this molecular weight range, the polymers are of superior solubility in low boiling chlorinated solvents such as chloroform, chlorinated benzene solvents, trichlorethylene and the like, including mixtures thereof, providing in combination with a curing agent improved curable compositions without the necessity of using different solvents for "A" staging to accomplish homogeneity. In addition, the art requires a method for simplifying the production of improved solutions for postcuring, or admixture with parapolyphenylene solids and the like or thermoplastic resinous materials which may advantageously be converted to useful thermoset materials.

It is accordingly an object of this improvement to provide the art with methods of preparing improved solutions of heat curable polyphenylene lacquer and plastic material and the improved products provided thereby.

Another object of this improvement is to provide the art with an improved method of preparing solutions of the preferred polyphenylene polymers, with or without modification, and curing agent in a partially cured state facilitating the method of preparation and application of the partially polymerized polyphenylene polymers as thermosetting resins of resinous curing agents and plastics.

Further objects and advantages will become more clearly apparent and understood from the following disclosure or description in conjunction with the illustrated example.

The soluble and fusible aromatic polymers that are preferably employed in the process and products of this disclosure are those heretofore considered less desirable because they are less thermally stable *prior to cure* than higher molecular weight polymer fractions although they have equivalent thermal stability after proper cure and post cure.

As disclosed in the above application, the preferred polymers are obtained by the cationic oxidative polymerization of monomers of biphenyl, terphenyl, quaterphenyl, isomers thereof, and mixtures of the same, and mixtures of the same with phenylene or aromatic monomers and polymers with not more than 5 and preferably less than 5 aromatic rings. Otherwise such aromatic polymers are branched polyphenyl resins, polyphenylene oxide resins, polyphenylene sulfide resins, and the like, and mixtures of the same, or mixtures of the preferred polyphenylene polymers in combination with the curing agent material may be prepared in a usable lacquer or plastic state in condition for thermosetting to provide useful coating, lamination, and plastic material. As is contemplated herein, the polyphenyl polymers may be modified with, or utilized to modify polymers and copolymers of phenylene oxide, polyphenylene oxide homopolymers, polyphenylene sulfide homopolymers, polyphenylene sulfide copolymers, and the like polymers, including addition thereto of solids of the same and solids of para-polyphenylenes, and the like, any of which may be soluble or insoluble in the solvents such as chloroform, trichlorethylene and the halogenated solvents in which the polyphenylenes are soluble. The solids of para-polyphenylene, and the like, may be utilized in the manner described in my application for "New Resin Compositions and Method of Preparation" filed herewith, Ser. No. 665,284 (now abandoned for C.I.P., Ser. No. 104,779, filed Jan. 6, 1971, with retention of the prefiled subject pertinent hereto).

The polymers of polyphenylenes as utilized herein were prepared as follows, for example:

EXAMPLE A

A mixture of m-terphenyl (230 g., 1.0 mole), biphenyl (77 g., 0.5 mole), benzene (55 g., 0.7 mole), and anhydrous cupric chloride (807 g., 6.0 mole) is prepared and heated to 165° C in an oil bath. While stirring continuously, anhydrous aluminum chloride (187 g.) is gradually added to the reaction mixture over a 2-hour period. The mixture is then cooled, pulverized, and additional aluminum chloride (67 g.) is added. It is then reheated at 165°C for an additional 45 minutes.

The crude polymer is thoroughly cleaned by treatment with concentrated hydrochloric acid (12N), then 6N hydrochloric acid, and finally water. The cleaning may be effected by first treating with 66N then 12N, or either or both, as desired. After drying, the product weighs 355 grams. Unreacted monomers and low molecular weight oligomers (≈210 grams) were extracted from the crude polymer by continuous extraction with hot benzene. The lower molecular weight polymer fraction extracted by the benzene had a melting point of about 120° ± 20° C. Continuous extraction of the benzene-insoluble residue with hot bromobenzene, at and near its boiling point, yields polymer (69 g.) having a mean molecular weight of about 1,500 and melting at 190°–220° C.

EXAMPLE B

A mixture of 46 g. (0.2 mole) ortho-terphenyl and 30.8 grams (0.2 mole) biphenyl and 108 g. (0.8 mole) anhydrous cupric chloride was heated to 135° C. While stirring continuously, 145 grams (1.1 mole) anhydrous aluminum chloride was added in small portions over a one-hour period. Heating then was continued for 3¼ hours at temperatures varying between 158°–180° C. The inorganic salts were removed by several washings with 6N hydrochloric acid, followed by several water washes. This removal may be accomplished using from 6N to 12N hydrochloric acid or using 12N hydrochloric acid alone, followed by water washes. After extracting the washed product continuously in a Soxhlet extractor with a boiling mixture of benzene (15–20 percent) in cyclohexane for two days, the product was then extracted continuously with hot chlorobenzene, at and near to boiling, for one day. The chlorobenzene solution was concentrated to a small volume and the polymer (10.8 g) was precipitated with cyclohexane. This polymer fraction melted at 180°–220° C.

EXAMPLE C 1,3,5-Triphenylbenzene (51.1 g., 0.167 mole) and anhydrous cupric chloride (44.8 g., 0.333 mole) were mixed in a resin kettle heated by means of an oil bath, and anhydrous aluminum chloride (45 g., 0.34 mole) was added in portions over a period of 1½ hours. At the start of the reaction, the temperature of the reaction mixture was 176° C (triphenylbenzene melts at 170° C). An extremely vigorous reaction occurred with the addition of the first portion of aluminum chloride (2 g.). Copious quantities of gas were evolved, and the mixture foamed up and quickly turned dark. After the initial reaction, the evolution of hydrogen chloride was very slow and the further addition of aluminum chloride apparently had little effect. The reaction was continued for a total of 3 hours, with the temperature varying between the limits of 136° and 182° C. The mixture remained fluid and was stirred throughout the reaction. When heating ceased, there was essentially no more evolution of gas.

After cooling, the product was ground in a mortar and extracted and washed on the filter as follows: (1) with concentrated hydrochloric acid (1 l) and washed with more acid (22 ml.) and with water; (2) with boiling concentrated hydrochloric acid (500 mole) and washed with acid (100 ml.) and with water; (3) twice with boiling methanol (500 ml. ea.) and washed with methanol and with water; (4) with boiling concentrated hydrochloric acid (500 ml.) and washed with water; (5) with boiling methanol (500 ml.) and washed with methanol. The methanol solutions were combined, and water was added to precipitate 8.78 g. (17.3 percent yield) of unreacted monomer or polymer of a very low molecular weight.

The dark, greenish-brown polymer (39.8 g.) was thoroughly dried and extracted with benzene for 1 day in a Soxhlet extractor. After distilling most of the solvent from the extracts, the product was precipitated with hexane and dried in a vacuum oven at 100° – 110° C. This polymer fraction weighed 15.1 g., corresponding to a 29.8 percent yield, and melted at 143° – 158° C.

Further illustrative of the preparation of polyphenylene polymers is the following:

EXAMPLE A'

The following were run simultaneously, using in each the same amounts of biphenyl, m-terphenyl and cupric chloride. Each example was conducted by heating the mixture of biphenyl and m-terphenyl to 100° C in a common oil bath, adding the aluminum chloride to the molten monomers, followed by the slow addition, over a period of about 1½ hours at 100° C, of the cupric chloride. After the cupric chloride had been added, the reaction mixture in each case was stirred mechanically for three hours at 100° C.

A very profound difference in viscosity was noted in each example after the complete addition of the cupric chloride and after the reaction was essentially complete. At the end of the reaction period, the temperature of the oil bath was raised to 120° C and the viscosity of each batch was measured with a Brookfield Viscosimeter. The following Table summarizes the results of this series of examples.

| Batch | Biphenyl | m-Terphenyl | AlCl₃ | CuCl₂ | Viscosity at 120° C, in centipoises | Yield*, percent |
|---|---|---|---|---|---|---|
| 1 | 20 gm. (0.13 mole). | 30 gm. (0.13 mole). | 13.3 gm. (0.10 mole). | 53.6 gm. (0.4 mole). | Solid, crumbly material thru reaction. | 28 |
| 2 | do | do | 26.6 gm. (0.20 mole). | do | 2,000,000–3,000,000 | 46 |
| 3 | do | do | 53.6 gm. (0.40 mole). | do | 450,000 | 70 |
| 4 | do | do | 106.4 gm. (0.80 mole). | do | 150,000 | 40 |

*Yield specified is the relative yield of the polymer fraction which is most suitable for use in formulating thermosetting polymer lacquers. Yield shown is percent conversion based on CuCl₂. The yields represent the "useful" polymer fraction as defined by certain solubility characteristics; namely, non-extractability with a mixture of boiling benzene (10%) in hexane (90%) but extractable with a proper solvent as hot to boiling chlorobenzene or other suitable solvent, as indicated.

It is apparent from these results that proportion of aluminum chloride has a very large effect upon melt viscosity of the particular reaction mixture. Example A'–1 represents a condition where satisfactory mixing was not possible and it is doubtful that a sigma blade-type mixer could handle the material. On the other hand, the reaction mixtures of Example A'–3 and Example A'–4 were fluid and could be stirred with ease in an efficient manner with very little expenditure in power for mixing.

EXAMPLE B' ortho-terphenyl (46.0 g., 0.2 mole)
biphenyl (30.8 g., 0.2 mole)
cupric chloride (dry, 108.0 g., 0.8 mole)

The above ingredients were mixed and heated to 135°c with stirring. During the first hour 145 g. (1.1 mole) of aluminum chloride was added in small portions and the temperature was allowed to rise to 165° C. Heating continued for 3¼ hours additional while the temperature varied between 158° and 180° C. The hot product was treated with dilute hydrochloric acid (6N) several times, then with water. After drying, the polymer was extracted with cyclohexane in a continuous extraction (43 hours) and this procedure removed 30 percent of the product (low molecular weight). The remaining portion was then extracted continuously with hot toluene. The portion of the polyphenylene which was recovered from the third and fourth days extractions melted from 180°–220° C.

The non-phenolic aromatic polymethylol compounds that are employed in the present processing are also aromatic structures, having 2 or more methylol groups, such that the methylol groups are on the same or different fused or attached ring groups. Such compounds have the characteristic structures:

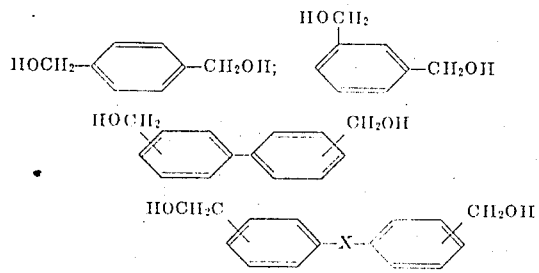

where X may be

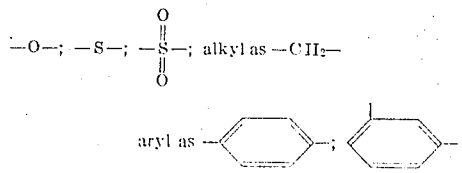

and similar groups or fused or non-fused ring groups which are stable at high temperatures. The curing agent likewise may contain attached non-interfering halogen, alkoxy, aryloxy, alkyl, and aryl groups, and mixtures of the same. Typical examples of such types of compounds are 1,4-xylylene-glycol, m-xylyleneglycol, 1-methyl 2,5-dimethylolbenzene; 1-phenyl-3, 5-dimethylolbenzene; 1-phenyl-2-methyl-3, 5-dimethylolbenzene; p,p'-dimethylolbiphenyl, and the like, compounds and mixtures thereof, all of which are generally classed as non-phenolic aromatic polymethylol material or compounds. Such compounds may be inherently represented by a characteristic formula as $HOCH_2RCH_2OH$ and R contains one or more aromatic ring groups, as above illustrated, with two or more methylol groups on the same or different ring structure.

The acid is preferably an aromatic sulfonic acid material as p-toluenesulfonic acid, benzenesulfonic acid, acetamidobenzenesulfonic acid, cyclohexanesulfonic acid and the like, or other acid material as phosphoric acid, phosphonic or phosphonous acids, alkylphosphonic acids, arylphosphonic acids, alkylphosphonous acids, arylphosphonous acids, sulfuric acid, methane sulfonic acid, and strong halogenated alkyl- and arylcarboxylic acids, and mixtures of same which can inherently be designated $R'OH$ with $R'$ the acid moiety minus the OH and which acids or acid like materials are reactive with the aromatic polymethylol compound or polyoxyxylylenes and derivatives of such acid materials. Such acid material inherently providing such telomer structure as $R'+OCH_2RCH_2+_nOR'$ with $R'$ the acid moiety as above indicated, R being one or more aromatic rings, and n is one or more. Such compounds are preferably used in combination with the polyphenylene polymers to cure the same and compositions thereof. Such combinations, with or without relative inert or reactive organic or inorganic modifying filler matter, provide useful insoluble and infusible coatings, laminating and plastic compositions having improved heat resistant or thermal and insulation properties applicable to ablative conditions and commercial use.

Illustrative of the combination of the polymethylol and acid catalyst to form the curing agent combination for the herein describe polyphenylenes are the following, for example:

EXAMPLE D 1.5 grams of 1,4-dimethylolbenzene was mixed with 0.1 gram of p-toluenesulfonic acid monohydrate. The reaction was carried out in an open beaker to facilitate the removal of water which was evolved during the reaction. The mixture was heated to about 120° C to obtain a clear fluid melt an heating was continued at about 100°–120° C with stirring, When the reaction melt had become viscous, heating was stopped and the reaction product cooled. When cool, the product was a plastic white, resinous solid moldable under heat and pressure or readily soluble in chloroform and other similar solvents with retention of its ability to cure polyphenylene and other aromatic polymers.

The retention of the soluble characteristic is in combination with a retention of available acid in a free or associated state effecting curing of the aromatic polymers when combined therewith and heat cured.

EXAMPLE E 0.9 gram of 1,4-dimethylolbenzene was mixed with 0.6 gram of p-toluenesulfonic acid monohydrate. The mixture was heated in a beaker up to about 120° C to melt the composition, and the reaction was carried out for a period of 40 seconds. The very viscous melt was rapidly cooled to room temperature to give a white solid product which was soluble in chloroform to yield somewhat cloudy, heat-curable solution. The amount of solvent present determines the fluidity for independent use, or preferred use as a catalyst system for curing the aromatic compounds, as described.

EXAMPLE F

One hundred and fifty-one grams (1.09 mole) of 1,4-dimethylolbenzene and 50 grams (0.263 mole) of p-toluenesulfonic acid monohydrate were dissolved in 1,500 ml. of 1,1,1-trichloroethane by heating the mixture at its boiling point of 74° C. The mixture was heated under reflux with a trap arranged so that water was continuously removed from the condensate and just trichloroethane returned to the boiling mixture. The ingredients dissolved as reaction occurred finally to yield a clear solution.

After 2½ hours of refluxing, 14 ml. of water had been collected. After 10 hours of refluxing, 22 ml. of water were found in the trap, and after 16 hours when the reaction was terminated, 24 ml. of water had been collected.

If we assume that 4.7 ml. of water resulted from esterification of the p-toluenesulfonic acid with the dimethylolbenzene, and that an additional 4.7 ml. of water was obtained from the dehydration of the monohydrate, then 14.6 ml. of water can be assumed to be due to the polymerization of the dimethylolbenzene. Furthermore, $(1 - 1/n)$ moles of water will be evolved due to polymerization from each mole of 1,4-dimethylolbenzene, where n is the average degree of polymerization of the resulting polymer. In the case of this example, $1.09 \times 18 (1 - 1/n)$ is placed equal to 14.6, the water resulting from polymerization. Solving for $n$, there is obtained $n = 3.9$. This means that approximately four dimethylolbenzene molecules have been joined to give a polymer molecule, which is terminated wholly or in part by p-toluenesulfonate groups.

EXAMPLE G

Ten grams of 1,3-dimethylolbenzene and 3 grams of p-toluenesulfonic acid in chloroform (100 ml.) were heated at reflux for 20 hours while continuously removing water, as described. Upon cooling and removing solvent, the polymerized composition formed a white plastic solid which was resoluble in hot chloroform.

The above, in solution form, when added to a refluxing solution of 20 grams polyphenylene (MW 1000) in trichloroethylene (40 ml.) and reacted for 20 hours at 70° C, formed a heat-setting lacquer which was used to coat, impregnate, and fabricate molded parts, as herein described. Upon careful evaporation of the solvent, without heat setting of the composition, a solid results which can be molded and thermoset, or ground for subsequent re-dissolving, dispersion, or molding and thermosetting.

EXAMPLE H

A resinous plastic composition and curing agent solution for polyphenylene oxides, polyphenylene sulfides and polyindene was prepared by refluxing a mixture of 1,4-dimethylolbenzene (10 g.), p-toluenesulfonic acid monohydrate (3 g.) and chloroform (100 ml.) for 20 hrs. while removing water azeotropically. The solution may be utilized as in the above examples or by adding one or more of the above components thereto and continuing heating under reflux until the mixture is a homogeneous liquid, to form a coating solution, or upon careful removal of the solvent, a solid plastic thermosetting resin results.

EXAMPLE I

Further, a curing agent solution for the indicated compounds was prepared by heating at reflux a mixture of 1,3-dimethylolbenzene (10 g.), and p-toluenesulfonic acid monohydrate (3g.) in chloroform (100 ml.) while removing water continuously. Upon careful removal of the solvent, a resoluble theremosetting solid results. Illustratively, a preferred use is in the resoluble state, as in the above solution form, in combination with a refluxing solution of polyphenylene (20 g., M.W. about 1,000) in trichloroethylene (40 ml.) which, after reacting for 20 hours, provides a heat curing lacquer useful in coating, impregnation, and fabricating molded parts. Otherwise, upon careful removal of the solvent, a thermoplastic solid is obtained capable of being molded and thermoset.

As above illustrated, it is the polymers and telomers of the aromatic polymethylol compounds and the acid catalyst which form the curing agent combinations which may be illustrated by the structure of the xylylene glycol condensation polymers as represented by:

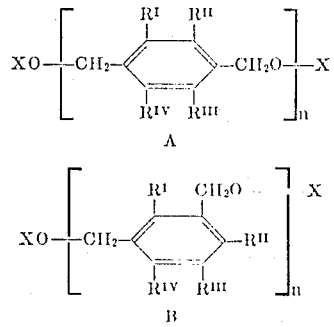

"A" and "B" represent the preferred structures of polyoxyxylylene telomers or polymers. In such representation, $n$ represents the extent of polymerization and may be 2 or more. X represents either hydrogen or an acid group where acid group refers to strong acids with an OH group abstracted, such as the toluenesulfonyl group, benzenesulfonyl group, acetamidobenzenesulfonyl group, hexanesulfonyl group, cyclohexanesulfonyl group, other alkyl and aryl sulfinyl and sulfonyl groups, mixtures of the same, and other groups, as herein indicated. Examples of the acids from which such groups are derived are toluenesulfonic acid, benzenesulfonic acid, acetamidobenzenesulfonic acid, hexanesulfonic acid, cyclohexanesulfonic acid, benzenesulfinic acid, methanesulfonic acid, benzenesulfonyl chloride, phosphoric acid, arylphosphonous acid, sulfuric acid, strong halogenated carboxylic acids, and mixtures of the same. $R^I$, $R^{II}$, $R^{III}$, and $R^{IV}$ can be non-interfering hydrogen, alkyl, aryl, aralkyl, alkaryl, alkoxy, or aryloxy, and mixtures of the same, including partially halogenated derivatives thereof. The methylol groups may be on the same or on different and adjacent benzene rings, or on associated benzene rings connected by oxygen, sulfur, an alkylene group or an arylene group. For example, the non-phenolic polymethylol compounds that are employed to provide the present illustrative embodiment of starting monomers can have structures of the following typical character:

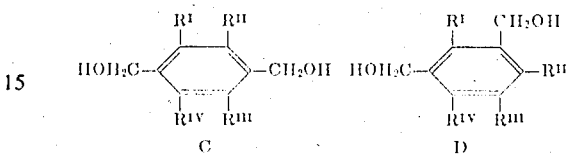

which may be generally designated of different structures as follows:

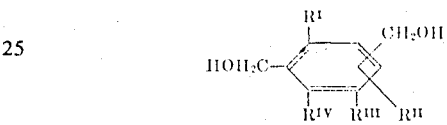

wherein the groups $R^I$, $R^{II}$, $R^{III}$, and $R^{IV}$, may be hydrogen, alkyl, aryl, aralkyl, or alkaryl groups. Typical examples of this type of compound are p-xylylene glycol ("C" where $R^I$, $R^{II}$, $R^{III}$, $R^{IV}$ = hydrogen); m-xylylene glycol ("D" where $R^I$, $R^{II}$, $R^{III}$, $R^{IV}$ = hydrogen); 1-methyl-2,5-dimethylolbenzene ("C" where $R^I$ = methyl and $R^{II}$, $R^{III}$, $R^{IV}$ = hydrogen); 1-phenyl-3,5-dimethylolbenzene ("D" where $R^{III}$ = phenyl and $R^I$, $R^{II}$, $R^{IV}$ = hydrogen); 1-phenyl-2-methyl-3,5-dimethylolbenzene ("D" where $R^{III}$ = phenyl, $R^{II}$ = methyl, and $R^I$ and $R^{IV}$ = hydrogen), and the like, including mixtures thereof.

In the above structural formulas, any two adjacent R groups taken together can represent a single aromatic ring fused to the attached ring. Typical examples of this latter type of compound are: 9,10-dimethylol anthracene ("C" where $R^I$ and $R^{II}$ = fused phenyl ring and $R^{III}$ and $R^{IV}$ also = fused ring) and the like. Higher methylol derivatives can be represented by "C" and "D" and wherein one or more of the R groups is a methylol group and the remainder have hydrogen, alkyl, aryl, alkaryl or aralkyl groups. In a like manner, the R and methylol groups may be situated in a non-interfering relationship, on different and connected aromatic rings. For the case where they are situated on different adjacent rings, we can illustrate by the structural formulas shown below:

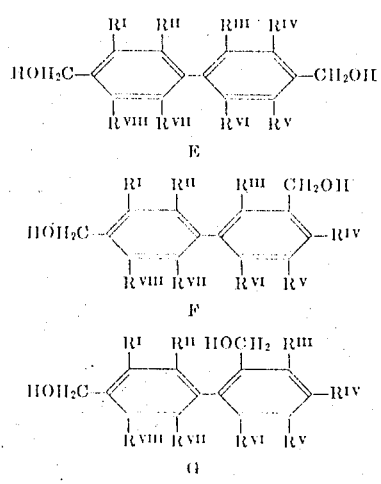

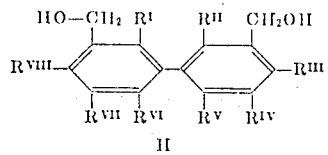

which may be more generally indicated as a different structure:

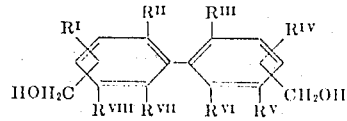

As indicated, comparable monomers and derivatives including other additional similar structures can be illustrated, including those with internal ring closure, of the character disclosed. A typical example of this type of aromatic polymethylol compound is p,p'-dimethylolbiphenyl ("E" where $R^I$, $R^{II}$, $R^{III}$, $R^{IV}$, $R^V$, $R^{VI}$, $R^{VII}$, $R^{VIII}$ = hydrogen). Furthermore, in the structural formulas, any combination of two adjacent R groups can represent a fused aromatic ring. On the other hand, higher methylol derivatives can be represented by allowing one or more of the R groups of the aromatic polymethylol to be non-adjacent methylol groups and the remaining R groups to be non-interfering hydrogen, alkyl, aryl, aralkyl, alkaryl, aryloxy, alkoxy groups, including partially halogenated derivatives thereof. In structure "G" the $R^{II}$ and $R^{VII}$ groups are preferably other than hydrogen and can be alkyl, aryl, aralkyl or alkaryl. Other types of non-phenolic aromatic polymethylol compounds that may be employed in the formation of the polymers and telomers of this invention are those compounds in which the methylol groups are situated on different benzene rings separated one from the other by one or more phenylene groups, by aryl and fused benzenoid ring groups or by aliphatic groups or chains. All of the illustrated compounds and structures fall under the general description non-phenolic aromatic polymethylol compounds, including mixtures thereof which are applicable herein.

Further examples of the aromatic polymethylol monomeric or polymeric materials are those similar to the structures in "E", "F", "G", and "H", wherein the rings are joined by a group Z, the compounds having the structures generally indicated by:

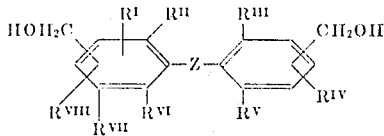

where —Z— is —O—, —S—,

a short chain alkylene group or groups and arylene group or groups, and the groups as $R^I$, $R^{II}$, $R^{III}$, $R^{IV}$, $R^V$, $R^{VI}$, $R^{VII}$, and $R^{VIII}$, as indicated are non-interfering hydrogen, alkyl, aryl, aralkyl, alkaryl, alkoxy, aryloxy, partially halogenated derivatives thereof and mixtures of the same which in the presence of a suitable non-metal acid catalyst, can form soluble and plastic aromatic polymers capable of heat setting and preferably effecting heat setting useful coating and plastic aromatic polyphenylene material without detrimental contamination when in combination therewith.

The curable resins comprising the reaction products of the aromatic polymers as polyphenylenes, with or without modification, can be cured by mixtures thereof with the curing agent material in polymeric or monomeric form in conjunction with the acid catalyst, as herein illustrated.

Various proportions of either the aromatic polymer constituent or the curing agent non-phenolic polymethylol aromatic portion may be used in the reaction with a suitable proportion of the preferred acid catalyst added initially for sufficient reaction to effect partial cure. Thereafter, if necessary, addition of the same or stronger acid catalyst to effect final cure may be made. The catalyst acid content is usually initially added in amounts of less than molar equivalent to effect partial polymerization. In this respect, the aromatic polymethylol compound and acid may be added to the aromatic polymers in monomer or telomer form, or both.

A typical and preferred range of the resin forming composition is an ingredient proportion of from 2–1 to 4–1 of aromatic phenyl or phenylene polymers to non-phenolic polymethylol aromatic and acid telomer compound, respectively. The combination may be provided in monomer, polymer, or combination form. It is necessary for those using the components and composition to select the range of properties desired and then choose those ingredients and reaction conditions which will yield compositions having the desired range of properties. For example, while the above range is recommended, a range of 10:1 is possible.

To the accomplishment of the foregoing description, further objects and advantages will be recognized in conjunction with the following description and examples given for purposes of illustration. Accordingly, to the accomplishment of the foregoing and related ends, this invention, discovery, and improvement then comprises the features heretofore described and hereinafter illustrated, are inherent herein, and as particularly pointed out in the claims. Such illustrative embodiments are indicative of the various ways in which the principles of my discovery, invention or improvements may be employed, for example:

EXAMPLE 1

Polyphenylene (30 g., m.p. 160°–180° C and m.w. 1,000 ± 500), 1,4-xylyleneglycol (15 g.) and p-toluenesulfonic acid monohydrate (5 g.) were slurried in chloroform (200 ml.) and heated to boiling under reflux for 19 hours. During this time, approximately 1.6–2.0 ml. of water was evolved and collected. Upon cooling a lacquer solution was obtained.

EXAMPLE 2

Another lacquer solution was prepared as in Example 1 using 45 g. of polyphenylene polymers (1,000 ± 500 m.w.) obtained from the process of preparing same as disclosed in the herewith filed application of "Commercially Useful Polyphenylene Polymers And Method of Production Thereof", Ser. No. 665,262, wherein I am co-inventor with Leroy J. Miller (now abandoned for C.I.P., Ser. No. 27,178, filed Apr. 4, 1970) the prefiled subject of which, is included herein by reference thereto.

EXAMPLE 3

In another lacquer preparation similar to the process of Example 1, I used 60 g. of polyphenylene polymers (1,000 ± 500) derived as in Example 2.

EXAMPLE 4

Various solutions of polyphenylenes having a mean molecular weight of 1,000 ± 500 were reacted with a curing agent derived from the reation of an aromatic non-hydroxy polymethylol compound and acid polymerization catalyst therefor in a solvent solution.

The polyphenylenes were obtained as herein described and in the manner disclosed in my herewith filed copending application entitled "Improvement in the Method of Preparing Polyphenylene Polymers and Products Thereof," Ser. No. 665,308, filed Sept. 5, 1967, now U.S. Pat. No. 3,595,811, included above and herein by reference thereto, and consising of polymers of biphenyl, terphenyl, quaterphenyl isomers of terphenyl and quaterphenyl, mixtures thereof and mixtures of same with other phenyl compounds having not more than 5 and preferably less than 5 aromatic rings, in the molecular weight range of 1,000 ± 500, as indicated.

The curing agent was derived after the manner of preparation described in the application of Leroy J. Miller and myself entitled "Aromatic Resinous Curing System and Method," Ser. No. 665,303 (now abandoned for C.I.P. Ser. No. 69,169 filed Sept. 21, 1970, with retention of the prefiled subject pertinent hereto), and is included herein as describing curing agents available herein.

Representative of the telomer structure provided by Application Serial No. 665,303 and the structure R'$+$OCH$_2$RCH$_2+$$_n$OR', wherein R is one or more aromatic ring groups, n is one or more and R' is an acid group or moiety forming the terminal group minus the OH as derived from the heretofore indicated acid material.

The reactants can be separately added and applicable in the manner described in Examples 1 and 2 or in a prepolymerized state, as above described and as provided in the present example.

Herein, a lacquer preparation, as exemplary, was prepared by mixing 60 grams of the soluble polyphenylene polymers (prepared as illustrated) dissolved and slurried in (200 ml.) chloroform with a reaction product of 1,4 xylyleneglycol (15 g.) and p-toluenesulfonic acid monohydrate (5 g.) dissolved in chloroform (75 ml.) and initially reacted by being refluxed for about 20–40 hours while removing water azeotropically before being added to the polyphenylene solution. After mixing, the polyphenylene solution and the curing agent solution were heated to boiling under reflux for several hours (about 15 to 19). The mixture, then being in a partially reacted state, was cooled and the lacquer formed was used with no further treatment.

Each of the polymer lacquers prepared as in the above Examples were used to impregnate and coat portions of carbon cloth, known to the trade as HITCO CCA-1. After vacuum drying, typical laminates of several plies were stacked in a mold and molded at 425° F for 2 hours at 3,000 p.s.i. The samples were then heated under inert conditions (N$_2$) for 18 hours at 275° F and then heat programmed to 550° F over a 108 hour period. After cooling to 200° F, the samples were removed from the oven and the laminates were fully cured, very hard and tough. Each of the laminates prepared from the various examples, in a similar manner yielded cured, hard and tough moldings of a machinable character.

EXAMPLE 5

A preferred heat curing aromatic polymer solution composition is preferably prepared as described in Example 1, from polyphenylene polymers, having a mean molecular weight of 1,000 ± 500, partially reacted with a polymerized curing agent derived from the reaction of 1,4-benzenedimethanol and p-toluenesulfonic acid in a solvent, as chloroform, trichloroethylene, and the like, or solvent mixtures, in which the polyphenylene polymers, curing agent, polymerization catalyst and the partially cured polymers are soluble. This polymer composition provides a lacquer of the homogeneous thermosetting partially cured prepolymer which molds at lower temperature ($\approx$400° F) and pressures of (500 to 3,000 psi) to produce superior composites which present a smooth uniform appearance with improved or greater strength and superior hyperthermal properties and which can withstand temperatures of 400° C.

Additionally, upon careful evaporation of the solvent, without promoting premature curing or advancement of the polymer, the remaining solids are redispersable in such solvents as mono-, di-, trichlorobenzene, tetrachloroethylene, chloroform, trichlorethylene, dioxane, and the like or mixture of such solvents. In solution and dispersed form, the solutions may then be applied as heat curable coatings and impregnants, as desired. The dry powder can be molded by heat and pressure, to provide fully cured, hard and machinable parts and elements.

Having described the present embodiment of my discovery and improvement in the art, in accordance with the constitutional grant and the Patent Statute, it will be apparent that some modification and variations may be made within the scope of this disclosure without departing from the spirit and embodiment thereof. The specific embodiments above described are given by way of examples illustrative of my invention, discovery and improvement.

What is claimed is:

1. The method of preparing a homogenous thermosetting polyphenylene resin composition of selected soluble aromatic polyphenylene polymers having a mean molecular weight in the critical range of 500 – 1,500 in partially reacted copolymerized solvent soluble combination with a curing agent therefor in a ratio of at least 10 to 1, respectively, comprising the steps of:

A. preparing a liquid mixture and solution of:
  1. soluble polyphenylene polymers soluble in a solvent material selected from the group consisting of chloroform, trichloroethylene, monochlorobenzene, dichlorobenzene, trichlorobenzene, tetrachloroethylene, dioxane, or mixtures of such solvents and having a mean molecular weight in the range of 500 – 1,500 and selected from the group consisting of the polymer products of biphenyl, terphenyl, quaterphenyl, and isomers thereof, including 2,2'-, 3,3'-, 2,3'-, 2,4'-, 3,4'-, diphenyl biphenyls, the 1,2,3-, 1,2,4-, and 1,3,5-triphenyl benzene, including mixtures of said compounds, mixtures of said compounds with other phenylene or polyphenyl compounds with not more than 5 aromatic rings, and including such mixtures with a small amount of benzene up to about one-third by weight, in combination with:
  2. a curing agent combination comprised of a coreactant combination of:
     a. an aromatic polymethylol or polyoxyxylylene compound represented by the formula HOCH$_2$RCH$_2$OH and having two or more methylol groups on the same or different ring (R) structure having one or more characteristic rings selected from the group consisting of:

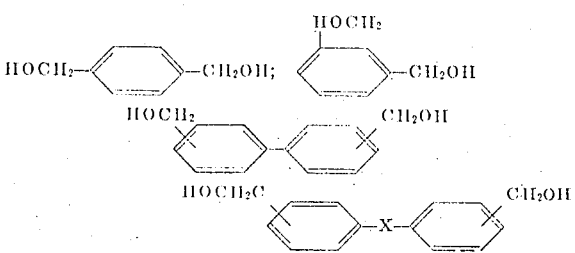

where X may be

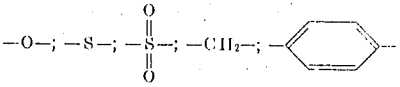

including mixtures of said ring compounds, and said rings containing hydrogen or substituent non-interfering halogen, alkoxy, aryloxy, alkyl, and aryl groups, and mixtures of such substituents, and b. an acid catalyst designated R'OH wherein R' is the acid moiety minus OH and the acids are selected from the group consisting of aliphatic or aromatic sulfonic acid material, phosphoric acid material, phosphonic acid material, alkyl or arylphosphonous acid material, sulfuric acid, halogenated alkyl or aryl-carboxylic acid material, and mixtures of said acid material characterized as reactive with said aromatic polymethylol or polyoxyxylylene and derivatives thereof providing curing agents having a relatively generic structure $R'+OCH_2RCH_2+_nOR'$ wherein R and R' are as above defined and n is 1 or more in combination with said soluble polyphenylene polymers, B. heating said mixture to the reflux temperature of said liquid mixture for a period of time to obtain a copolymerized homogeneous solution of said soluble polyphenylene polymers and said curing agent, and C. recovering a solvent soluble lacquer solution of said polymers of polyphenylene and curing agent combination soluble in one or more of the solvents selected from the group consisting of chloroform, trichloroethylene, monochlorobenzene, dichlorobenzene, trichlorobenzene, tetrachloroethylene, dioxane, or mixtures of such solvents.

2. The method of claim 1 wherein the acid catalyst is a strong acid and the curing agent is thereby terminated by esterification with said strong acid.

3. The method of claim 1 including the step of removing the liquid and retaining the said copolymer mixture in redispersible fusible powder form.

4. The method of claim 1 including the step of heat curing said mixture to a substantially fully polymerized insoluble solid state.

5. The method of claim 1 including the steps of applying the said recovered copolymer product as an impregnant or coating and heat curing said polymers and copolymers to a substantially fully copolymerized state.

6. A composite mixture of copolymerized polyphenylene polymers of the molecular weight of about 1,000 to about 2,500 soluble in heated chlorinated benzene solvents and a curing agent selected from the group consisting of an aromatic polymethylol having terminal groups of an acid moiety minus an OH group, a polyfunctional sulfonyl halide, and mixtures of the same likewise soluble.

7. The product of claim 6 contained in a heat resistant relatively solvent insoluble state.

* * * * *